United States Patent Office 2,781,405
Patented Feb. 12, 1957

2,781,405
FLUORO ETHERS AND METHOD OF PREPARATION

Julius G. Shukys, Chatham Township, Morris County, N. J., assignor to Air Reduction Company, Incorporated, New York, N. Y., a corporation of New York No Drawing. Application May 28, 1952, Serial No. 290,581

1 Claim. (Cl. 260—614)

This invention relates to fluoroalkyl vinyl ethers, and more particularly, to lower fluoroalkyl vinyl ethers which can be represented by the following formula:

$$X-CH_2-O-CH=CH_2$$

wherein "X" stands for a fluoroalkyl radical containing at least two carbon atoms, for example; pentafluoroethyl, heptafluoropropyl and the like radicals. The invention also embraces the method for preparing the novel compounds.

In general, the novel fluoroalkyl vinyl ethers can be prepared by vinylating lower fluoroalkanols containing at least three carbon atoms with acetylene in the presence of the corresponding alkali metal fluoroalkanolates, for example; potassium fluoroalkanolate. The fluoroalkanols can be represented by the following formula:

$$X-CH_2OH$$

in which "X" is defined as above. The vinylation reaction can be illustrated by the following equation:

$$X-CH_2OH + CH\equiv CH \xrightarrow{X-CH_2OMe} X-CH_2-O-CH=CH_2$$

wherein "X" means the same as above and Me stands for an alkali metal, for example; sodium, potassium, lithium and the like.

In a preferred embodiment of practicing the process, an excess of the fluoroalkanol is treated with an alkali metal, for example, potassium, in a suitable solvent, for instance, ethyl ether, and after removal of the ether, the resulting reaction mixture, which contains both the fluoroalkanol and the potassium fluoroalkanolate, is vinylated with acetylene. The alkali metal hydroxides, rather than the alkali metals per se, can be employed to produce the alkali metal fluoroalkanolates. However, this introduces water in the reaction mixture, which would require removal prior to vinylation with acetylene.

The following examples will serve to illustrate the invention.

Example 1

2,2,3,3,3-pentafluoropropanol (296 g.) was added dropwise to a stirred suspension of potassium metal (11 g.) in ethyl ether (250 ml.) while cooling the reaction mixture. After all the metal had gone into solution, the ethyl ether was distilled off by fractional distillation. The residue comprising 2,2,3,3,3-pentafluoropropanol and potassium 2,2,3,3,3-pentafluoropropanolate was charged into a bomb and reacted with acetylene introduced under 250 p. s. i. at 150° C. for 5 hours. The bomb was then cooled to room temperature and the reaction mixture was fractionally distilled, yielding 2,2,3,3,3-pentafluoropropyl vinyl ether boiling at 52–60° C. On redistillation, the compound had a boiling point of 57.8° C. at 758 mm.

Example 2

2,2,3,3,4,4,4-heptafluorobutanol (279 g.) was added dropwise to a stirred suspension of potassium metal (6.7 g.) in ethyl ether (250 ml). When the potassium metal had gone into solution the ethyl ether was distilled off. The residue comprising 2,2,3,3,4,4,4-heptafluorobutanol and potassium 2,2,3,3,4,4,4-heptafluorobutanolate, was charged into a bomb and reacted with acetylene introduced under 260 p. s. i. and at 150° C. for 6 hours. The reaction mixture, on fractional distillation, yielded 2,2,3,3,4,4,4-heptafluorobutyl vinyl ether which boiled at 75–77.5° C.

The new ethers are useful for diverse purposes; for example, as solvents, and intermediates in various chemical reactions. Thus, they can be subjected to bromination to form bromine addition derivatives, or may be subjected to polymerization to form polymers useful in making coatings and films.

I claim:

The method of preparing 2,2,3,3,3-pentafluoropropyl vinyl ether which comprises reacting 2,2,3,3,3-pentafluoropropanol with acetylene at elevated temperatures of about 150° C. and elevated pressures of about 250 p. s. i. in the presence of potassium 2,2,3,3,3-pentafluoropropanolate and separating 2,2,3,3,3-pentafluoropropyl vinyl ether from the products of said reaction.

References Cited in the file of this patent

UNITED STATES PATENTS

| Number | Name | Date |
|---|---|---|
| 2,021,869 | Reppe et al. | Nov. 19, 1935 |
| 2,406,674 | Evans | Aug. 27, 1946 |
| 2,462,347 | Barrick | Feb. 22, 1949 |
| 2,472,811 | Dickey | June 14, 1949 |
| 2,579,411 | Adelman | Dec. 18, 1951 |